United States Patent Office 2,882,068
Patented Apr. 14, 1959

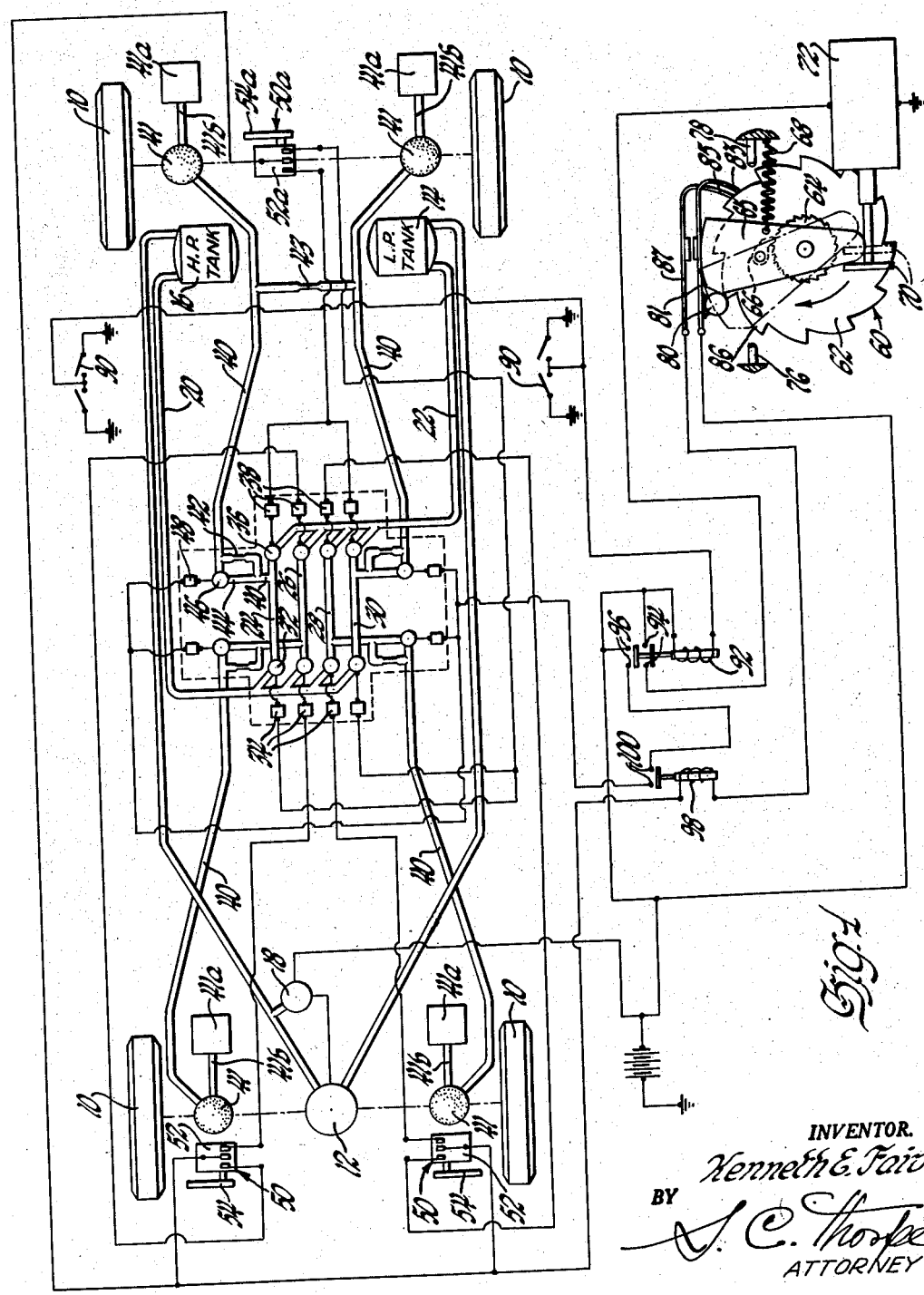

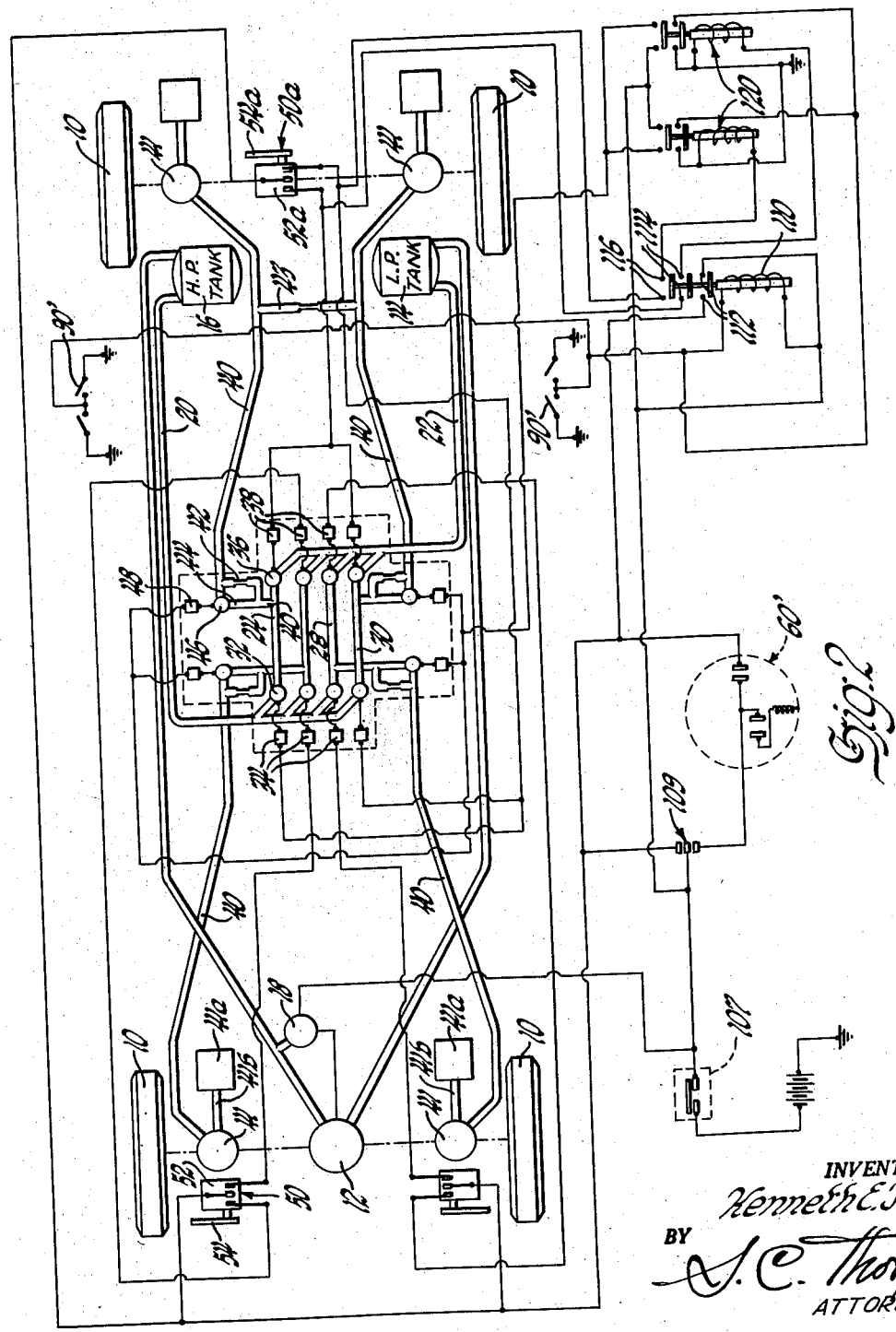

2,882,068

AIR SUSPENSION CONTROL SYSTEM

Kenneth E. Faiver, Lansing, Mich., assignor to General Motors Corporation, Detroit, Mich., a corporation of Delaware Application October 22, 1956, Serial No. 617,424

19 Claims. (Cl. 280—124)

This invention concerns control apparatus for a vehicle suspension system utilizing pneumatic springs in lieu of the conventionally employed metal springs.

Pneumatic springs afford a number of substantial advantages apart from the improved ride they provide. Thus, spring replacement is largely eliminated since there is no metal fatigue; and because of the absence of metal to metal contact lubrication is unnecessary. Incident to the improved riding qualities, body stresses are markedly reduced, road shocks being more completely absorbed with the transmission of fewer vibrations to the body.

Another advantage inherent in air suspension has relation to the ease and rapidity with which the spring height may be changed. With such a suspension, it is possible by charging or discharging air from the springs upon a change in load to maintain the vehicle body at a constant level with respect to the axles irrespective of load. This levelling of the vehicle body may be accomplished automatically using equipment presently available—see, for example Rossman Patent 2,670,201 of February 23, 1954.

The Rossman and other related devices include a time delay mechanism serving to prevent their operation except when the vehicle is being loaded or unloaded, the purpose being to avoid changes in body height from axle deflections caused by ordinary road shocks. For the most part, such devices were developed for use on heavy vehicles, as trucks and buses, and they have been found to perform satisfactorily in this connection. In the case of passenger cars, however, it is deemed advisable to provide for levelling not only during loading and unloading but also with the vehicle in motion, since the load change may occur so rapidly (e.g. quick discharge of one or more passengers with an immediate re-start) as not to allow sufficient time for the proper height adjustment to take place.

Continued levelizing action is further desirable after the car has gotten underway to compensate for shifts in load, as when a heavy passenger behind the driver shifts from one side of the car to the other, and to make up for loss of weight due to fuel consumption and minor air leaks, which are prone to occur. Still another reason for providing for levelizing with the car in motion has relation to the situation where the levelizing action during the passenger loading or unloading occurred while the vehicle was standing on a road surface which was not horizontal. Here, in the absence of corrective means, the vehicle until the next stop tends to be disposed in a pitched attitude, adversely effecting the comfort of the passengers and the operation of the suspension.

As indicated, the present invention aims to provide the control system for an air suspension which allows for levelizing while the vehicle is in motion.

Another object is to provide such a system which in operation serves to prevent over compensation during inertia conditions due to accelerating, braking, or turning. In other words, the invention seeks to supply levelizing means which are effective with the vehicle in motion, but which do not respond substantially to body height changes caused by roll, squat, or dive.

A further object of the invention is to provide for fast levelizing under static conditions and relatively slow levelizing under dynamic conditions.

Still another object is to provide a control system characterized in operation in that with the vehicle in motion air can be normally charged to or withdrawn from the pneumatic springs only intermittently, to the end of sparing the air compressor from an undue amount of work and to the end of reducing the current consumed by the control parts, where electrical.

An additional object is to provide a device for overruling the means responsible for the intermittent action for a predetermined period when the vehicle is set in motion before the levelizing is complete.

A still further object is to provide a control system for the purpose described in which the fast levelizing with the vehicle stationary is brought into play by a vehicle condition normally obtaining only when the vehicle is stopped. This condition is desirably the opening of one of the doors of the vehicle.

Other objects and features of the invention will become apparent from the subsequent description wherein:

Fig. 1 is a diagrammatic view of the suspension system including a schematic electrical control circuit therefor; and Fig. 2 is a diagrammatic view similar to Fig. 1, incorporating a modified electrical control system.

Briefly described, the control system to which the drawings are addressed comprises a plurality of solenoid operated valves governing the air flow to and from the pneumatic springs. The conduit to each spring has an orifice or restriction therein with a valve controlled bypass around the restriction. Under dynamic conditions, i.e. when the vehicle is in motion, the air flow is through the restrictions; whereas under static conditions the restrictions are bypassed. An interrupter device is employed to limit air and current usage when the vehicle is in motion. Such device has associated therewith means disrupting its intermittent action so as to allow for continued constant air flow for a short period following a start up if the levelizing was not completed before the start up.

Referring now to Fig. 1, the system is shown associated with a vehicle having four road wheels 10. An air compressor 12 may be powered by an electric motor carried by the vehicle or may be driven via the generator shaft, for example. The compressor is part of a closed system comprising a low pressure tank 14 from which it draws and a high pressure tank 16 to which it discharges. A pressure responsive device 18 cuts out the compressor when the pressure in tank 16 reaches a predetermined value.

A pressure line 20 extending from the high pressure tank has communication with an exhaust line 22 leading to the low pressure tank 14 through a plurality of connections 24, 26, 28, and 30. Each such connection has therein a valve 32 controlled by a solenoid 34 and a valve 36 controlled by a solenoid 38. Branching from each connection is a conduit 40 extending to one of the springs 41 and having a restriction 42 therein and a bypass 44 around the restriction. Valves 46 operated by solenoids 48 govern flow through the bypasses. In addition to the restrictions therein, the two rear conduits 40 have interconnection through a restriction 43.

Pneumatic springs 41 may be of any suitable type but springs corresponding in general to the air spring disclosed in application S.N. 575,120, filed March 30, 1956, in the name of Von D. Polhemus, are preferred. As here illustrated, each of the springs has associated therewith additional air space in the form of a reservoir 41a, the spring action being marked by transfer of air between the spring and reservoir via the conduit 41b.

A height-sensing device 50 located at each front spring 41 includes a switch assembly 52 and an arm 54. On installation, the switch assembly is secured to the sprung portion of the vehicle while the lower end of the arm 54 is fastened to an unsprung member, normally the corresponding axle. One of the contacts of the assembly 52 will be seen as connected to the solenoid 34 functional with relation to the particular spring, while the other will be noted as connected to the corresponding solenoid 38.

At the rear of the vehicle between the rear springs 41 is a third height-sensing device 50a having an arm 54a connecting at its free end to the rear axle. Switch assembly 52a, like assemblies 52 is fixed to the vehicle frame or body. Device 50a, as indicated, serves both rear springs and to this end the contacts thereof are electrically connected to the valves 34 and 38 corresponding to the rear springs. With this arrangement, i.e. with one centrally positioned height-sensing device serving both rear springs, a three-legged "milk stool" effect is provided, precluding a condition where three of the springs would carry all or substantially all of the load. Such a condition could conceivably develop in the event each of the rear springs, like the front springs, had a separate levelling device associated therewith.

Connection 43 between the conduits 40 serving the rear springs assures equal pressures in the two springs, while the restriction acts to prevent excessive air transfer from roll during turns.

It should be evident that with the vehicle in motion, the normal ride movements cause the height control switches to operate almost continuously about the neutral off position. However, actuation of the solenoid valves 34 and 38 with charging of air to or discharging of air from the springs through the restrictions 42 can only occur when the common feed circuit to the switch assemblies 50, 50a is energized. And it should be apparent from the drawing that the energization of the feed circuit requires closing of the contacts 81 and 87.

Contacts 81 and 87 are under the control of an "interrupter" 60 driven by a clock mechanism in a clockwise direction. The interrupter is comprised of a toothed wheel 62 having a ratchet wheel 64 fixed thereto. A cam device 65 pivoted on the ratchet wheel and having a dog 66 engaging the teeth thereof is urged by a spring 68 in a clockwise direction. At its lower end, the cam is engaged by a flange 70 fixed to the outer end of the armature component of a solenoid 72. Movement of the cam, which is adapted to engage a ball follower 80 carried by a lower spring contact 81, is limited by stops 76 and 78. The end 83 of the spring contact rides on the toothed wheel 62 forwardly of the end 85 of an upper spring contact 87. With such arrangement (ignoring for the moment the cam 65, the purpose of which will be later explained), the circuit is open except when the ends of the spring contacts are on the same teeth. Thus, the arbitrary period of energization of the circuit is a function of the spacing between the ends of the spring contacts. In the case of one installation, the contacts are maintained closed for ten seconds between two hundred second open periods, thereby reducing in the ratio of 20:1 the quantity of air used, and the amount of current consumed by the solenoid valves 34 and 38. It has been determined that with this timing, load shifts occurring with the vehicle in motion, losses from leakage, and loss of weight through fuel consumption are fully compensated for.

Due to the restrictions 42, the levelling taking place with the vehicle in motion occurs relatively slowly; hence if contacts 81 and 87 are closed by the timer wheel when the car body is in a pitched attitude e.g. rolled due to a turn, the air movement is so slow that the pitched attitude, on cessation of the condition which induced it, is generally not noticeably maintained. Moreover, any excess air charged to or withdrawn from a spring is soon taken care of on subsequent closings of the contacts.

While it is desirable for the reasons indicated that the air flow be slow when the vehicle is in motion, the opposite is true during loading and unloading when the vehicle is stationary, and it is for this reason that the bypasses 44 are provided. Obviously, during loading or unloading one or more of the vehicle doors are open and according to the invention this condition is utilized to open the bypasses. Thus, there is supplied in association with each door a grounded switch member 90. Closing of any of these switch members results in energization of a relay 92, with closing of the normally open contacts 94 and 96. The consequent energization of solenoid 72 brings about swinging of cam 65 counterclockwise on its pivot until it engages stop 76. Ball follower 80 is raised by the action of cam 60 and contacts 81 and 87 are closed causing energization of relay 98 if any of the contacts comprised in switch assemblies 50, 50a are closed. Energization of relay 98 is marked by closing of the contacts 100 so that bypass valves 46 are opened by the corresponding solenoids. With valves 46 open, air flow to and from the springs can occur without restriction, fast levelling being assured.

Upon closing of all doors and the de-energization of solenoid 72, spring 68 tends to pull cam 65 clockwise against stop 78, but is delayed from doing so by the dog 66 which compels the cam to return to stop 78 at timer wheel speed. The width of the cam may be such as to maintain contacts 81 and 87 closed, with the car under way, for a period of three hundred seconds, calculated as sufficient to complete the levelling if the levelling was not completed when the vehicle was stationary. The air flow incident to the continued levelling occurs through the restrictions in view of the de-energization of relay 92 on opening of the door switches.

In the modification of Figure 2 wherein like numerals refer to like parts in Figure 1, cam 65 is dispensed with and the continued constant flow for a limited period after start up is provided by electric latch means. The signal for the latch is taken from the rear switch assembly 52a, the greatest spring deflection usually occurring at the rear wheels, and the continued flow is through the bypasses 44. Operation of the door and latch circuit is as follows: While the car is standing and the engine not running, energization of the switch assemblies 52 and 52a is accomplished through a special ignition switch 109 the upper contact of which is engaged by the middle contact when the ignition is in the off position. Such switch receives current through a master control switch 107. With the ignition on, i.e. with the middle contact of switch 109 engaging the lower contact, energization of the switch assemblies proceeds through a circuit interrupter 60' providing the arbitrary ten seconds on and two hundred seconds off sequence. On the opening of any door incident to loading or unloading of the vehicle, door switch 90' puts ground on the coil of relay 110 which operates to close the normally open contacts 112, voltage being always applied to the opposite terminal of the relay coil, whether the ignition is on or off. The feed circuit to all of the switch assemblies is thus energized. If the contacts of switch assembly 52a are closed for either fill or discharge, current will be seen as supplied through one of the contacts 114 and 116 of relay 110 to the coil of one of two relays 120. This results in the closing of the contacts of the particular relay 120, current accordingly being supplied to the bypass valve solenoids 48 and to the ground side of relay 110. Should the doors be thereafter closed, relay 110 is held energized through one of the grounded relays 120 until the switch 52a contacts open, that is, until the rear of the vehicle has been corrected for height.

I claim:

1. In an automotive vehicle having a plurality of road wheels or the equivalent and a pneumatic spring associated with each wheel, a regulating system for said springs comprising: a source of air pressure carried by the vehicle, an air passage between said source and each individual spring, electrically actuable valve means in each said passage, valve energizing means associated with each spring operative responsive to changes in the height of the sprung portion of the vehicle, means for exhausting air from said springs, and a timer mechanism controlled current interrupter in electric circuit with each of said valve means whereby with the vehicle in motion such valve means are opened to permit air flow through said passages, when called for by the height sensing means, for intermittent periods of predetermined duration.

2. A regulating system according to claim 1 including means effective when the vehicle is stationary, and when a predetermined condition exists, to maintain said valve means open without interruption for so long as said height-sensing means call for air flow.

3. In an automotive vehicle having a plurality of road wheels or the equivalent and a pneumatic spring associated with each wheel, a regulating system for said springs comprising: a source of air pressure carried by the vehicle, an air passage between said source and each individual spring having a restriction therein, a bypass passage around each said restriction, a pair of valves in each said passage, one positioned upstream of the restriction and being adapted for electrical actuation, the other positioned in said bypass and being electrically actuable to allow for airflow therethrough, means associated with each spring operative responsive to changes in the height of the sprung portion of the vehicle for energizing said upstream valves, means for exhausting air from said springs, a timer mechanism controlled current interrupter in electric circuit with each of said upstream valves operable when the vehicle is in motion to open said valve to permit air flow through the corresponding restrictions, when called for by the corresponding height-sensing means, for intermittent periods of predetermined duration, means associated with said current interrupter adapted to overrule the action thereof so that with the vehicle stationary said upstream valves may be maintained open without interruption when said height-sensing means call for air flow, the overrule means being governed by means actuated on the occurrence of a particular vehicle condition, normally obtaining only when the vehicle is stationary, these last means being in electric circuit with said bypass valves and operating to open the same on the occurrence of said condition.

4. A regulating system according to claim 3 where said overrule means operates to cause said upstream valves to remain open without interruption for a predetermined period immediately following cessation of the said condition if said height-sensing means call for air flow.

5. In an automotive vehicle having a plurality of road wheels or the equivalent and a pneumatic spring associated with each wheel, a regulating system for said springs comprising: a high pressure tank served by a compressor carried by the vehicle, a low pressure tank from which said compressor draws, four separate air passages, means connecting one of each of said passages with said high pressure tank, low pressure tank and an individual spring, an electrically actuable valve in each of said passages, height-sensing means associated with each spring for energizing the corresponding electrically actuable valves, and a timer mechanism operated current interrupter in electric circuit with each of said electrically actuable valves whereby such valves are selectively opened to permit flow through said passages, when said height-sensing means are in energizing positions, for intermittent periods of predetermined duration.

6. A regulating system according to claim 5 including means effective when the vehicle is stationary, and when a predetermined condition obtains, to maintain said electrically actuable valves selectively openable without interruption, when said height-sensing means call for air flow, for so long as such condition exists.

7. A regulating system according to claim 6 where the vehicle is equipped with one or more doors having circuit energizing means connected to said electrically actuable valves, and the condition bringing about uninterrupted flow through said electrically actuable valves is the opening of a door.

8. In an automotive vehicle having a road wheel and a pneumatic spring associated therewith, a regulating system for said spring comprising: a high pressure tank served by a compressor carried by the vehicle, a low pressure tank from which said compressor draws, an air passage between said high pressure tank and said low pressure tank having a pair of electrically actuable valves therein, an air passage branching from said last passage at a point mediate said electrically actuable valves and extending to said spring, said branch passage having a restriction therein and a bypass around said restriction, a third electrically actuable valve in said bypass, height-sensing means responsive to changes in the height of the sprung portion of the vehicle for energizing said electrically actuable valves to govern air flow to and from said spring, a current interrupter in electric circuit with said pair of valves, and a timer mechanism for controlling said current interrupter whereby with the vehicle in motion the said pair of valves are selectively opened to permit flow through said passages, when called for by said height-sensing means, for intermittent periods of predetermined duration, means associated with said current interrupter adapted to overrule the action thereof so that with the vehicle stationary either of said valves may be maintained open without interruption when said height-sensing means calls for air flow, said overrule means being governed by means actuated on the occurrence of a particular vehicle condition, normally obtaining only when the vehicle is stationary, these last means being in electric circuit with said third electrically actuable valve in said bypass and operating to open the same on the occurrence of said condition.

9. A regulating system according to claim 8 where said overrule means operates to cause one or the other of said pair of electrically actuable valves to remain open without interruption for a predetermined period immediately following cessation of the said condition if said height-sensing means calls for air flow.

10. In an automotive vehicle having a pair of road wheels and a pneumatic spring associated with each wheel, a regulating system for said springs comprising: a high pressure tank served by a compressor carried by the vehicle, a low pressure tank from which said compressor draws, a pressure conduit extending from said high pressure tank, an exhaust conduit leading to said low pressure tank, a pair of separate parallel connections between said conduits each having a pair of electrically actuable valves therein, an air conduit branching from one of said connections at a point mediate the valves therein and extending to one of said springs, an air conduit branching from the other of said connections at a point mediate the valves therein and extending to the other of said springs, a conduit interconnecting said branch conduits including a restriction, and means associated with the sprung and unsprung portions of the vehicle responsive to changes in the height of the sprung portion relative to the unsprung portion, said means energizing said valves to govern air flow to and from said springs.

11. In an automotive vehicle having a pair of road wheels and a pneumatic spring associated with each wheel, a regulating system for said springs comprising: a high pressure tank served by a compressor carried by the vehicle, a low pressure tank from which said compressor draws, a pressure conduit extending from said high pressure tank, an exhaust conduit leading to said low pressure tank, a pair of separate parallel connections between said conduits each having a pair of electrically actuable valves therein, an air conduit branching from one of said connections at a point mediate the valves therein and extending to one of said springs, an air conduit branching from the other of said connections at a point mediate the valves therein and extending to the other of said springs, a conduit interconnecting said branch conduits including a restriction, valve energizing means associated with the sprung and unsprung portions of the vehicle operable responsive to changes in the height of the spring portion relative to the unsprung portion, said means governing air flow to and from said springs, a current interrupter in electric circuit with said pairs of valves, and a timer mechanism operating said interrupter so that with the vehicle in motion the said valves are selectively opened to permit flow through said conduits, when called for by the height-sensing means, for intermittent periods of predetermined duration.

12. In an automotive vehicle having a pair of road wheels and a pneumatic spring associated with each wheel, a regulating system for said springs comprising: a high pressure tank served by a compressor carried by the vehicle, a low pressure tank from which said compressor draws, a pressure conduit extending from said high pressure tank, an exhaust conduit leading to said low pressure tank, a pair of separate parallel connections between said conduits each having a pair of electrically actuable valves therein, an air conduit branching from one of said connections at a point mediate the valves therein and extending to one of said springs, an air conduit branching from the other of said connections at a point mediate the valves therein and extending to the other of said springs, a conduit interconnecting said branch conduits including a restriction, means associated with the sprung and unsprung portions of the vehicle responsive to changes in the height of the sprung portion relative to the unsprung portion, said means controlling said valves for governing air flow to and from said springs, and a timer mechanism operated current interrupter in electric circuit with said pairs of valves operative to cause intermittent flow through said conduits, when the height-sensing means are in flow permitting positions, and means associated with said current interrupter for overruling the action thereof when the vehicle is stationary so that any of said valves may be maintained open without interruption when said height-sensing means calls for air flow, said overrule means being governed by means actuated on the occurrence of a particular vehicle condition, normally obtaining only when the vehicle is stationary.

13. In an automotive vehicle having a pair of road wheels and a pneumatic spring associated with each wheel, a regulating system for said springs comprising: a high pressure tank served by a compressor carried by the vehicle, a low pressure tank from which said compressor draws, a pressure conduit extending from said high pressure tank, an exhaust conduit leading to said low pressure tank, a pair of separate parallel connections between said conduits each having a pair of electrically actuable valves therein, an air conduit branching from one of said connections at a point mediate the valves therein and extending to one of said springs, said last conduit having a restriction therein and a valve controlled bypass around said restriction, an air conduit branching from the other of said connections at a point mediate the valves therein and extending to the other of said springs, said second branch conduit having a restriction therein and a valve controlled bypass around the restriction, a conduit interconnecting said branch conduits including a restriction, means responsive to changes in the height of the sprung portion of the vehicle and controlling the pairs of valves for governing air flow to and from said springs, a current interrupting timer mechanism in electric circuit with said pairs of valves whereby with the vehicle in motion the same are selectively opened to permit flow through said conduits, when called for by said height-sensing means, for intermittent periods of predetermined duration, means associated with said timer mechanism for overruling the action thereof so that with the vehicle stationary any of said valves comprised in said pairs of valves may be maintained open without interruption when said height-sensing means calls for air flow, said overrule means being governed by means actuated on the occurrence of a particular vehicle condition, normally obtaining only when the vehicle is stationary, these last means being in electric circuit with the valve controlling said bypass and operating to open the same on the occurrence of said condition.

14. A regulating system according to claim 13 where the energization of said pairs of electrically actuable valves is effected through said height-sensing means.

15. A regulating system according to claim 13 where said overrule means operates to cause a valve comprised in said pairs of valves to remain open without interruption for a predetermined period immediately following cessation of the said condition if said height-sensing means calls for air flow.

16. In an automotive vehicle having front and rear road wheels or the equivalent and a pneumatic spring associated with each wheel, a regulating system for such springs comprising: a source of air pressure carried by the vehicle, an air passage between said source and each individual spring having a restriction therein, a bypass around each said restriction, a pair of valves in each said passage, one positioned upstream of the restriction and being adapted for electrical actuation, the other when opened allowing for air flow through the bypass and being similarly actuable, means associated with each front spring responsive to changes in the height of the sprung portion of the vehicle for controlling said one valve, a single such means functional with relation to the rear springs, means for exhausting air from said springs, a current interrupter in electric circuit with each of said upstream valves, and a timer mechanism operating to periodically open and close said interrupter whereby with the vehicle in motion the said upstream valves are opened to permit air flow through the corresponding restrictions, when called for by the corresponding height-sensing means, for intermittent periods of predetermined duration, relay means electrically connected to the said height-sensing means for overruling the action of said current interrupter so that with the vehicle stationary said upstream valves may be maintained open without interruption when said height-sensing means call for air flow, said relay means being governed by means actuated on the occurrence of a particular vehicle condition, normally obtaining only when the vehicle is stationary, and being circuited to the bypass valves to open the same on the occurrence of said condition.

17. A regulating system according to claim 16 including additional relay means circuited to said first relay means and the height-sensing means functional with relation to the rear springs, said additional relay means adapted to cause said upstream valves and said bypass valves to remain open without interruption following cessation of the said condition for so long as said just-recited height-sensing means call for air flow.

18. In an automotive vehicle having front and rear road wheels or the equivalent and a pneumatic spring associated with each wheel, a regulating system for such springs comprising: a high pressure tank served by a compressor carried by the vehicle, a low pressure tank from which said compressor draws, a pressure conduit extending from said high pressure tank, an exhaust conduit leading to said low pressure tank, a plurality of separate parallel connections between said conduits each having a pair of electrically actuable valves therein, an air conduit branching from one of said connections at a point mediate the valves therein and extending to one of the front springs, an air conduit branching from another of said connections at a point mediate the valves therein and extending to one of the rear springs, an air conduit branching from still another of said connections at a point mediate the valves therein and extending to another rear spring, a conduit interconnecting said last two conduits including a restriction, these said last two conduits each having a restriction therein upstream of said interconnecting conduit, a bypass around the restriction having a controlling valve, means associated with each of said front springs operative responsive to changes in the height of the sprung portion of the vehicle for controlling the associated pair of valves to control flow of air to said springs, a single such means functional with relation to the said rear springs, a timer mechanism including a current interrupter operated periodically in electric circuit with said pairs of electrically actuable valves whereby with the vehicle in motion the same are selectively opened to permit air flow through the corresponding restrictions, when called for by the corresponding height-sensing means, for intermittent periods of predetermined duration, relay means electrically connected to the height-sensing means for overruling the action of said timer mechanism so that with the vehicle stationary the valves comprised in said pairs of valves may be maintained open without interruption when said height-sensing means call for air flow, said relay means being governed by means actuated on the occurrence of a particular vehicle condition, normally obtaining only when the vehicle is stationary, and being circuited to the valves controlling said bypasses to open the same on the occurrence of said condition.

19. A regulating system according to claim 18 including additional relay means circuited to said first relay means and the height-sensing means functional with relation to the said rear springs, said additional relay means being adapted to cause the valves comprised in said pairs of valves and the bypass valves to remain open without interruption following cessation of the said condition for so long as said just-recited height-sensing means call for air flow.

References Cited in the file of this patent

UNITED STATES PATENTS

| | | |
|---|---|---|
| 1,105,805 | Liebowitz | Aug. 4, 1914 |
| 1,816,075 | Down | July 28, 1931 |
| 2,093,486 | Schoepf et al. | Sept. 21, 1937 |
| 2,506,726 | Magrum | May 9, 1950 |
| 2,762,633 | Gouirand | Sept. 11, 1956 |
| 2,787,475 | Jackson | Apr. 2, 1957 |